United States Patent
Stangeland et al.

(10) Patent No.: US 6,371,727 B1
(45) Date of Patent: Apr. 16, 2002

(54) TURBINE BLADE TIP SHROUD ENCLOSED FRICTION DAMPER

(75) Inventors: Maynard L. Stangeland; Clifford C. Bampton, both of Thousand Oaks, CA (US)

(73) Assignee: The Boeing Company, Chicago, IL (US)

(*) Notice: Subject to any disclaimer, the term of this patent is extended or adjusted under 35 U.S.C. 154(b) by 2 days.

(21) Appl. No.: 09/587,553

(22) Filed: Jun. 5, 2000

(51) Int. Cl.$^7$ .................................................. F01D 5/10
(52) U.S. Cl. ........................ 416/190; 416/191; 416/500
(58) Field of Search .................................. 416/190, 191, 416/500, 192, 195

(56) References Cited

U.S. PATENT DOCUMENTS

| | | | |
|---|---|---|---|
| 2,315,594 A | 4/1943 | Chalupa ..................... 416/191 |
| 2,315,598 A | 4/1943 | Corbett ....................... 416/191 |
| 3,752,598 A | * 8/1973 | Bowers et al. ............... 415/173 |
| 3,986,792 A | 10/1976 | Warner ....................... 416/190 |
| 4,177,011 A | 12/1979 | Eskesen et al. ............. 416/191 |
| 4,329,175 A | * 5/1982 | Turner ...................... 75/208 R |
| 4,401,411 A | 8/1983 | Hisano et al. ........... 416/196 R |
| 4,722,668 A | 2/1988 | Novacek .................... 416/190 |
| 5,201,850 A | 4/1993 | Lenhardt et al. ............ 416/190 |
| 5,522,705 A | 6/1996 | Elaini et al. ................ 416/190 |
| 5,730,584 A | 3/1998 | Dodd .......................... 416/190 |

FOREIGN PATENT DOCUMENTS

| | | | | |
|---|---|---|---|---|
| JP | 06221102 A | * | 1/1993 | ................ 416/190 |
| JP | 06221102 A | * | 8/1994 | ................ 416/190 |

* cited by examiner

Primary Examiner—Edward K. Look
Assistant Examiner—Richard Edgar
(74) Attorney, Agent, or Firm—Harness Dickey & Pierce P.L.C.

(57) ABSTRACT

A turbine disk assembly having an integrally bladed turbine disk and a plurality of captured damper members. The integrally bladed turbine disk includes a plurality of turbine blades that terminate at an integral tip shroud. A damper aperture is formed between each pair of adjacent integral tip shrouds and includes a first slotted portion and a second slotted portion. The first slotted portion is formed concentric to the two adjacent integral tip shrouds, extending circumferentially and axially through the two adjacent integral tip shrouds. The second slotted portion extends radially outwardly between the two adjacent integral tip shrouds. One of the damper members is disposed in the first slotted portion of the an associated damper aperture and frictionally engages at least one surface of each of the two adjacent tip shrouds to dissipate energy when relative motion occurs between the two adjacent integral tip shrouds to dampen vibration.

15 Claims, 2 Drawing Sheets

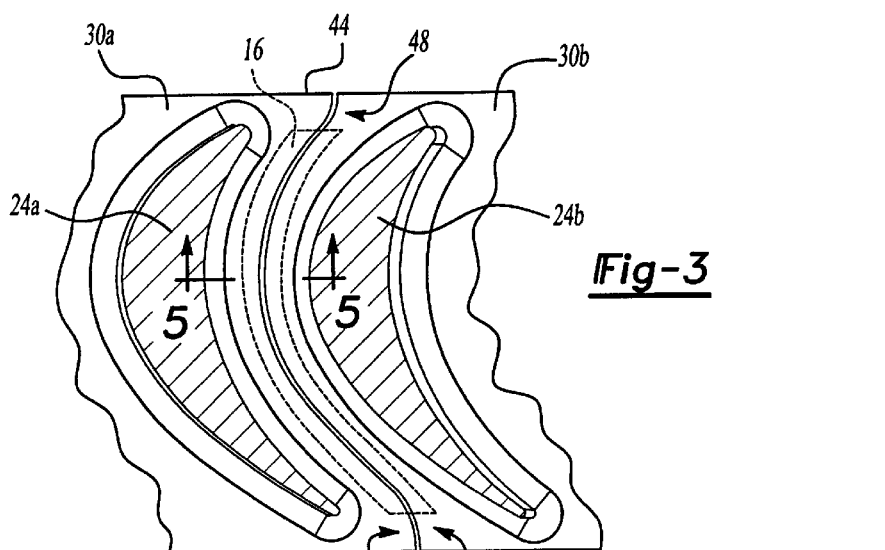
*Fig-3*
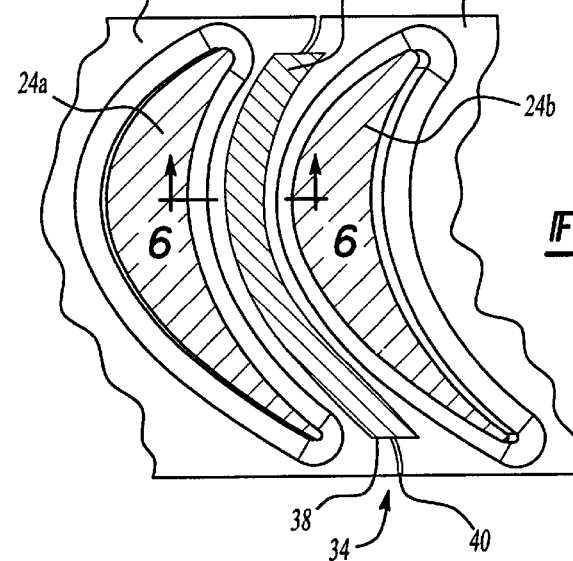
*Fig-4*
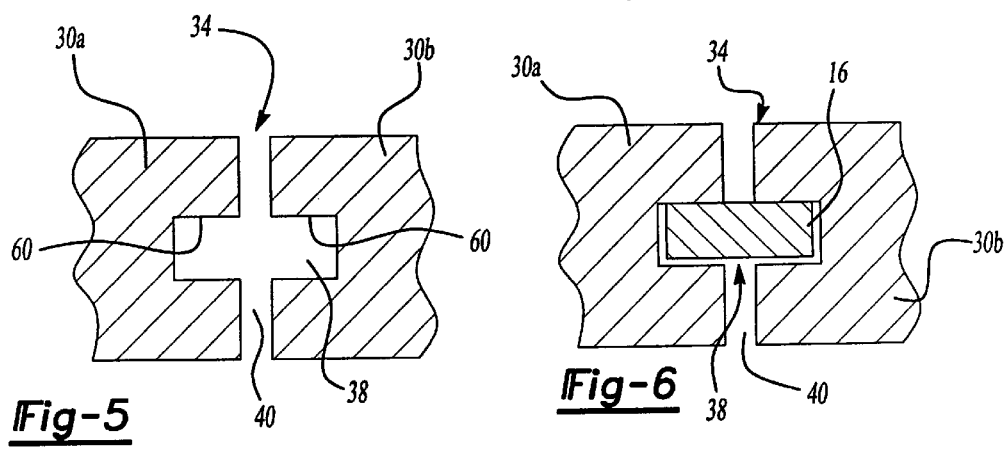
*Fig-5*
*Fig-6*

TURBINE BLADE TIP SHROUD ENCLOSED FRICTION DAMPER

BACKGROUND OF THE INVENTION

1. Technical Field

The present invention relates generally to turbines and more particularly to a turbine disk having an enclosed friction damper.

2. Background Art

Turbine disks and blades are commonly subject to high cycle fatigue failures due to high alternating stresses as a result of resonant vibration and/or fluid-structural coupled instabilities. Turbine disks are typically designed to avoid standing wave diametrical mode critical speeds within the operating speed range. High dynamic response occurs when the backward traveling diametrical mode frequency is equal to the forward speed diameteral frequency which results in a standing wave form with respect to a stationary asymmetric force field. Turbine blades are designed to avoid having any of the blade natural frequencies from being excited by the stationary nozzle forcing frequencies in the operating speed range.

In conventional turbine wheel assemblies, conventional blade dampening techniques are typically employed to reduce the fluid-structure instabilities that results from the aerodynamic forces and structural deflections. Accordingly, it is common practice to control both blade and disk vibration in the gas turbine and rocket engine industry by placing dampers between the platforms or shrouds of individual dovetail or fir tree anchored blades. Such blade dampers are designed to control vibration through a non-linear friction force during relative motion of adjacent blades due to tangential, axial or torsional vibration modes. Blade dampers, in addition to the blade attachments, also provide friction dampening during vibration in disc diametral modes.

Integrally bladed turbine disks (blisks) are becoming increasingly common in the propellant turbopumps of liquid fueled rocket engines and gas turbines. While the elimination of separate turbine blades reduces fabrication costs, the monolithic construction of integrally bladed turbine disks eliminates the beneficial vibration damping inherent in the separately bladed disk construction. Accordingly, the above-mentioned damping mechanism is not feasible for integrally bladed turbine disks unless radial slots are machined into the disk between each blade to introduce flexibility to the blade shank. The added complexity of the slots would increase the rim load on the turbine blade and defeat some of the cost, speed and weight benefits of the blisk. Consequently, the lack of a blade attachment interface results in a significant reduction in damping and can result in fluid-structure instabilities at speeds much lower than the disk critical speed and at minor blade resonances.

Rim dampers have been utilized by the gear industry to dampen diametral modes of vibration in thinly webbed large diameter gears. In such applications a split ring or series of spiral rings are preloaded in one or more retainer grooves on the underside of the gear rim. At relatively low rim speeds the centrifugal force on the damper ring provides damping due to relative motion when the gear rim experiences vibration in a diametral mode. This method of friction damping, however, is not feasible at high rim speeds because the centrifugal force on the damper ring is of sufficient magnitude to cause the damper to lock-up against the rim. Lock-up occurs when the frictional forces become large enough to restrain relative motion at the interface, causing the damper ring to flex as an integral part of the rim.

SUMMARY OF THE INVENTION

It is a general object of the present invention to provide a cost effective yet robust dampening mechanism for conventionally-bladed and integrally bladed turbine disk assemblies.

It is another object of the present invention to provide a dampening mechanism for a turbine disk assembly which positions a damper member between two adjacent tip shrouds to absorb vibration.

It is a further object of the present invention to provide an integrally bladed turbine disk assembly having damper members which are encased between two adjacent tip shrouds.

In one preferred form, the present invention provides an integrally bladed turbine disk assembly having an integrally bladed turbine disk and a plurality of captured damper members. The integrally bladed turbine disk includes a plurality of radially outwardly extending turbine blades and a plurality of damper apertures. Each of the turbine blades terminates at its distal end at an integral tip shroud. Each of the damper apertures is formed between two adjacent integral tip shrouds and includes a first slotted portion and a second slotted portion. The first slotted portion is formed concentric to the two adjacent integral tip shrouds, extending circumferentially and axially through the two adjacent integral tip shrouds. The second slotted portion extends radially outwardly between the two adjacent integral tip shrouds. The damper member is disposed in the first slotted portion of the at least one damper aperture, being preferably encased in the two adjacent integral tip shrouds when the integrally bladed disk is formed. The damper is frictionally engagable with at least one surface of each of the two adjacent tip shrouds to dissipate energy when relative motion occurs between the two adjacent integral tip shrouds to dampen vibration. The normal force on the interface between the damper and the two adjacent integral tip shrouds is a function of the centrifugal force acting on the damper mass due to the rotational speed of the integrally bladed turbine disk.

BRIEF DESCRIPTION OF THE DRAWINGS

Additional advantages and features of the present invention will become apparent from the subsequent description and the appended claims, taken in conjunction with the accompanying drawings, wherein:

FIG. 3 is a sectional view of the vibration damped, integrally bladed turbine disk assembly taken along the line 3—3 in FIG. 2;

FIG. 4 is a sectional view of the vibration damped, integrally bladed turbine disk assembly taken along the line 4—4 in FIG. 2;

FIG. 5 is a sectional view of the vibration damped, integrally bladed turbine disk assembly taken along the line 5—5 in FIG. 3 but illustrating only the integrally bladed turbine disk; and FIG. 6 is a sectional view similar to that of FIG. 5 but illustrating both the damper member and the integrally bladed turbine disk.

DETAILED DESCRIPTION OF THE PREFERRED EMBODIMENT

Figure 1:
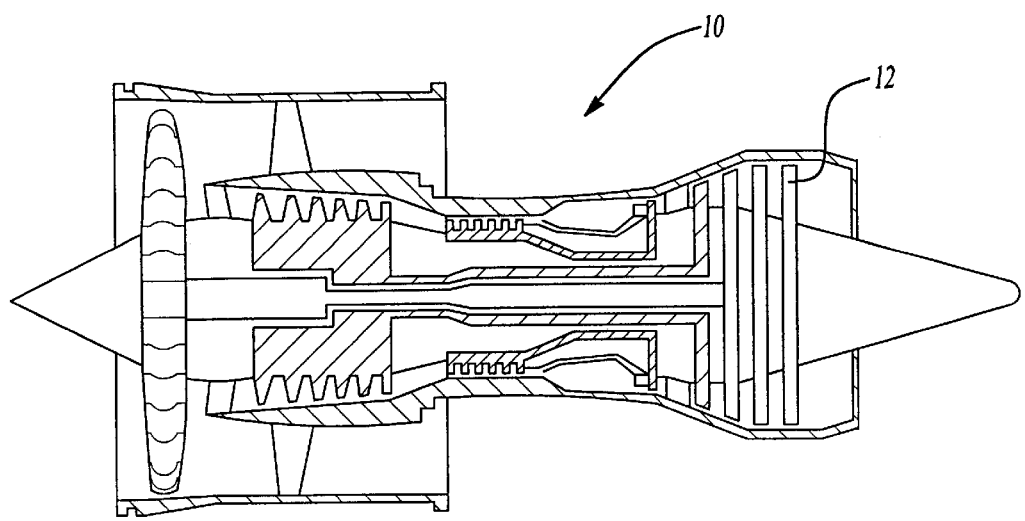
FIG. 1 is a simplified sectioned side view of a gas turbine engine incorporating a preferred embodiment of the vibration damped, integrally bladed turbine disk assembly of the present invention.

With reference to FIG. 1 of the drawings, a turbine 10 wherein various embodiments of the present invention may be effectively utilized is shown in a cross-sectional view. The turbine 10 is shown to include an integrally bladed turbine disk assembly 12.

Figure 2:
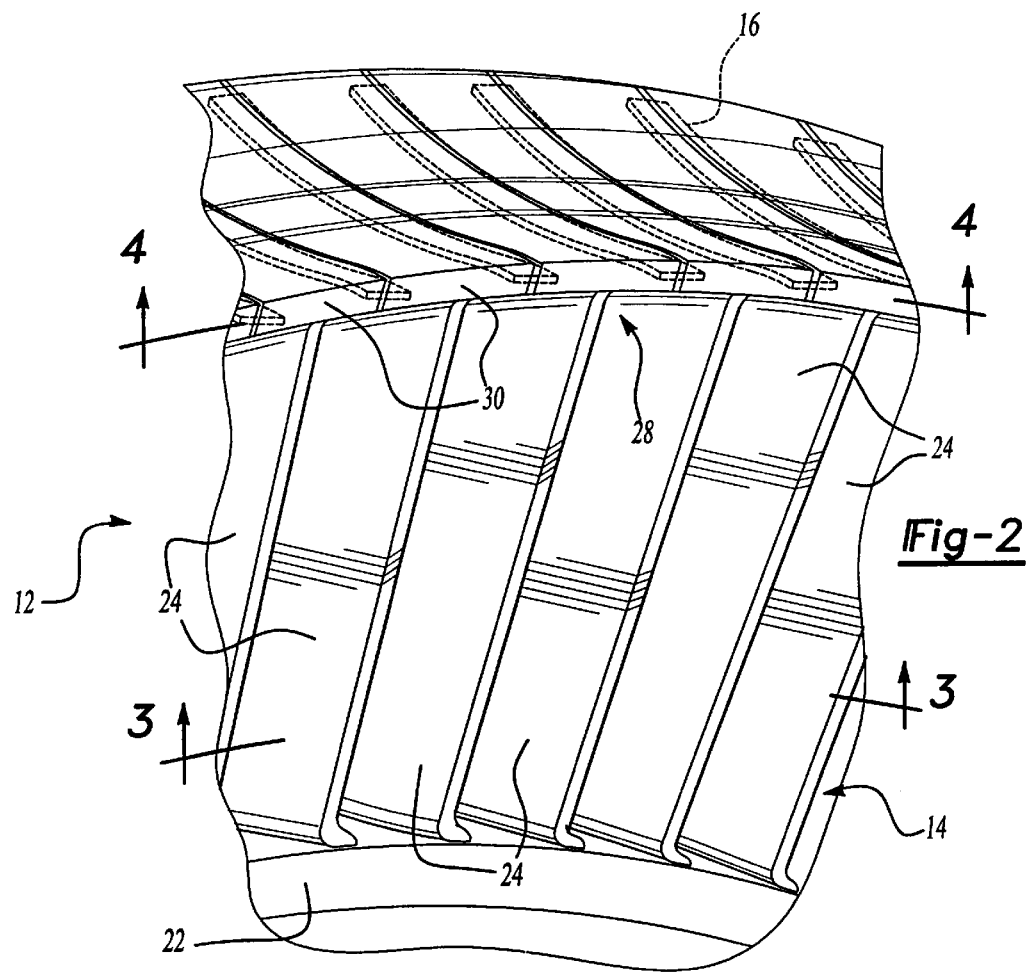
FIG. 2 is a perspective view of a portion of the vibration damped, integrally bladed turbine disk assembly of FIG. 1.

In FIG. 2, the integrally bladed turbine disk assembly 12 is shown to include an integrally bladed turbine disk 14 and a plurality of damper members 16. The unitarily formed, integrally bladed turbine disk 14 is shown to include a rotor portion 22 having a plurality of circumferentially spaced, radially outwardly extending blades 24. The distal end 28 of each of the blades terminates at an integrally formed tip shroud 30. The tip shrouds 30 cooperate to form a radially outer boundary to a gas path over the airfoil portion of the blades 24.

With additional reference to FIGS. 3 through 6, damper apertures 34 are formed between each of the adjacent tip shrouds (e.g., 30*a* and 30*b*). Each damper aperture 34 includes a first slotted portion 38 and a second slotted portion 40. The first slotted portion 38 is incorporated concentrically into the two adjacent tip shrouds 30*a* and 30*b*. In the particular example illustrated, the first slotted portion 38 of the damper aperture 34 has a generally rectangular cross section that terminates axially at a predetermined distance from the faces 42 and 44 of the integrally bladed turbine disk 14 and is curved to fit between the two adjacent blades 24*a* and 24*b*. The second slotted portion 40 extends radially outwardly between the two adjacent tip shrouds 30*a* and 30*b*, both intersecting the first slotted portion 38 and generally following the longitudinal axis of the first slotted portion 38. The end portions 48 of the second slotted portion 40 curve away from the longitudinal axis of the first slotted portion 38 and intersect the faces 42 and 44 of the integrally bladed turbine disk 14 at approximately right angles so as to minimize shroud overhang.

A damper member 16, formed from a suitable material such as metal or ceramic, is disposed in each of the first slotted portions 38. Each damper member 16 has a cross-section that is generally slightly smaller but otherwise conforms to the cross-section of the first slotted portion 38 so as to permit relative motion between damper member 16 and its associated adjacent tip shrouds 30. Preferably, the integrally bladed turbine disk 14 is formed around each of the damper members 16 through a process such as net-shape casting and hot isostatic pressure powder metallurgy.

In operation, a centrifugal force will be exerted on the damper members 16 when the integrally bladed turbine disk assembly 12 rotates. The centrifugal force causes a normal force to be exerted onto the damper members 16, causing the damper members 16 to frictionally engage surfaces (e.g., surfaces 60 in FIG. 5) on the two adjacent tip shrouds 30*a* and 30*b* to absorb energy to damp vibrations in the corresponding two adjacent blades 24*a* and 24*b*. Use of a damper member 16 having a rectangular cross-section that extends along the contour of adjacent blades permits friction damping to be applied over a relatively large area to provide increased durability. Those skilled in the art will understand that the damper members 16 may have a frictional surface for frictionally engaging the two adjacent tip shrouds 30*a* and 30*b* which is formed from a material that is resistant to fretting with the shroud patent metal. The damper frictional surface for frictionally engaging the two adjacent tip shrouds 30*a* and 30*b* extends across the width of the tip shrouds 30 to promote damping for disk diametrial mode relative motion as well as blade-to-blade axial tangential and torsional vibration modes.

While the integrally bladed turbine disk assembly 12 has been described thus far as including a plurality of damper members 16 which are encased between adjacent tip shrouds 30 during the formation of the integrally bladed turbine disk 14, those skilled in the art will appreciate that the invention, in its broader aspects, may be constructed somewhat differently. For example, the integrally bladed turbine disk 14 may be formed through machining (i.e., a machined integrally bladed turbine disk) and the damper apertures 34 may be introduced into the tip shroud 30 through machining processes such as electro-discharge machining. It is anticipated that the first slotted portion 38 of the damper apertures 34 would extend across the faces 42 and 44 of the integrally bladed turbine disk 14. Accordingly, an axial retention means, such as tabs formed on the damper members 16, could be employed to retain the damper members 16 in the first slotted portions 38 of the damper apertures 34.

While the turbine disk assembly 12 has been described thus far as being an integrally bladed turbine disk assembly, those skilled in the art will appreciate that the invention, in its broader aspects, may be constructed somewhat differently. For example, rotor portion 22 and the plurality of turbine blades 24 may be separately fabricated and assembled using construction techniques, such as fir-tree connectors, which are well known in the art. Accordingly, while the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. An integrally bladed turbine disk assembly comprising:
   an integrally bladed turbine disk having a plurality of radially outwardly extending turbine blades and at least one damper aperture, each of the plurality of turbine blades terminating at a distal end in a circumferentially extending tip shroud, the at least one damper aperture being formed between two adjacent tip shrouds and including a first slotted portion and a second slotted portion, the first slotted portion being incorporated concentrically into the two adjacent tip shrouds, the second slotted portion extending radially outwardly between the two adjacent tip shrouds; and
   a damper member disposed in the first slotted portion of the at least one damper aperture, the damper member frictionally engagable with at least one surface of each of the two adjacent tip shrouds to dissipate energy in the two adjacent tip shrouds to dampen vibration.

2. The integrally bladed turbine disk assembly of claim 1, wherein the damper member frictionally engages the two adjacent tip shrouds over a planar area.

3. The integrally bladed turbine disk assembly of claim 2, wherein the damper member has a rectangular cross-section.

4. The integrally bladed turbine disk assembly of claim 1, wherein the damper member is formed from a material selected from a group consisting of metal and ceramic.

5. The integrally bladed turbine disk assembly of claim 1, wherein the integrally bladed turbine disk is formed around the damper member.

6. The integrally bladed turbine disk assembly of claim 5, wherein the integrally bladed turbine disk is formed in a process selected from a group of processes consisting of net-shape casting and hot isostatic pressure powder metallurgy.

7. The integrally bladed turbine disk assembly of claim 1, wherein the damper member includes a frictional surface that is formed from a material that is resistant to fretting.

8. The integrally bladed turbine disk assembly of claim 1, wherein the damper member utilizes centrifugal force to apply a frictional force when relative motion occurs between the two adjacent tip shrouds to thereby damp vibrations in a pair of corresponding turbine blades.

9. The integrally bladed turbine disk assembly of claim 1, wherein the damper member experiences relative motion to dampen vibrations in the integrally bladed turbine disk that are caused by disk diametrial vibration modes and blade axial, tangential and torsional vibration modes.

10. An integrally bladed turbine disk assembly comprising:
- an integrally bladed turbine disk having a plurality of radially outwardly extending turbine blades and at least one damper aperture, each of the plurality of turbine blades terminating at a distal end in a circumferentially extending tip shroud, the at least one damper aperture being formed between two adjacent tip shrouds and including a first slotted portion and a second slotted portion, the first slotted portion being incorporated concentrically into the two adjacent tip shrouds, the second slotted portion extending radially outwardly between the two adjacent tip shrouds; and
- a damper member disposed in the first slotted portion of the at least one damper aperture;
- wherein application of centrifugal force to the damper member causes the damper member to frictionally engage at least one surface of each of the two adjacent tip shrouds to apply dissipate energy and dampen vibrations in a pair of turbine blades corresponding with the two adjacent tip shrouds; and
- wherein the damper member experiences relative motion to dampen vibrations in the integrally bladed turbine disk that are caused by disk diametrial vibration modes and blade axial, tangential and torsional vibration modes.

11. A turbine disk assembly comprising:
- a rotor structure;
- a plurality of turbine blades coupled to the rotor structure, the plurality of turbine blades extending radially outwardly of the rotor structure and including a plurality of damper apertures, each of the plurality of turbine blades terminating at a distal end in a circumferentially extending tip shroud, each of the plurality of damper apertures being formed between two adjacent tip shrouds and including a first slotted portion and a second slotted portion, the first slotted portion being incorporated concentrically into the two adjacent tip shrouds, the second slotted portion extending radially outwardly between the two adjacent tip shrouds; and
- a plurality of damper members, each of the plurality of damper members being disposed in the first slotted portion of one of the damper apertures such that each of the damper members is frictionally engagable with at least one surface of the two adjacent tip shrouds to dissipate energy in the two adjacent tip shrouds to dampen vibrations
- wherein the rotor structure and the plurality of turbine blades are unitarily formed.

12. The turbine disk assembly of claim 11, wherein each of the damper members has a rectangular cross-section.

13. The turbine disk assembly of claim 11, wherein the damper members are formed from a material selected from a group consisting of metal and ceramic.

14. The turbine disk assembly of claim 11, wherein each of the plurality of damper members utilizes centrifugal force to apply a frictional force to the two adjacent tip shrouds when relative motion occurs between the two adjacent tip shrouds to thereby damp vibrations in a pair of corresponding turbine blades.

15. The turbine disk assembly of claim 11, wherein each of the damper member experiences relative motion to dampen vibrations in the turbine disk assembly that are caused by disk diametrial vibration modes and blade axial, tangential and torsional vibration modes.

* * * * *